(12) United States Patent
Pernod et al.

(10) Patent No.: US 8,978,462 B2
(45) Date of Patent: Mar. 17, 2015

(54) HOT-WIRE SENSOR OF SUBMILLIMETER SIZE AND ASSOCIATED METHOD OF PRODUCTION

(75) Inventors: Philippe Jacques Pernod, Lille (FR); Leticia Gimeno Monge, Lille (FR); Abdelkrim Talbi, La Madeleine (FR); Alain Merlen, Lille (FR); Romain Victor Jean Viard, Riedisheim (FR); Vincent Mortet, Leuven (BE); Ali Soltani, Villeneuve D'ascq (FR); Vladimir Preobrazhensky, Villeneuve D'ascq (FR)

(73) Assignees: Centre National de la Recherche Scientifique, Paris (FR); Ecole Centrale de Lille, Villeneuve d'Ascq Cedex (FR)

( * ) Notice: Subject to any disclaimer, the term of this patent is extended or adjusted under 35 U.S.C. 154(b) by 29 days.

(21) Appl. No.: 13/640,621

(22) PCT Filed: Apr. 11, 2011

(86) PCT No.: PCT/IB2011/051546
§ 371 (c)(1), (2), (4) Date: Jan. 23, 2013

(87) PCT Pub. No.: WO2011/128828
PCT Pub. Date: Oct. 20, 2011

(65) Prior Publication Data
US 2013/0125644 A1    May 23, 2013

(30) Foreign Application Priority Data
Apr. 12, 2010   (FR) .................................. 10 01523

(51) Int. Cl.
*G01F 1/68* (2006.01)
*G01F 1/69* (2006.01)
(Continued)

(52) U.S. Cl.
CPC ................. *G01F 1/69* (2013.01); *G01F 1/6845* (2013.01); *G01F 1/692* (2013.01); *G01P 5/12* (2013.01)
USPC .............................. 73/204.27; 216/13; 29/847

(58) Field of Classification Search
CPC ......... G01F 1/6845; G01F 1/692; G01F 1/69; G01P 5/12
USPC .............................. 73/204.27, 204.26; 216/13
See application file for complete search history.

(56) References Cited

U.S. PATENT DOCUMENTS 3,333,470 A * 8/1967 Fingerson .................. 73/204.26
3,448,607 A * 6/1969 Russell ............................ 73/766

(Continued)

FOREIGN PATENT DOCUMENTS

| CN | 1474182 A * | 2/2004 | |
| DE | 19609167 A1 * | 9/1997 | ................ G01P 5/12 |
| DE | 10 2008 020874 | 11/2009 | |

OTHER PUBLICATIONS

Translation of the Written Opinon of the International Searching Authority for PCT/IB2011/051546 dated Jul. 12, 2011.
(Continued)

*Primary Examiner* — Lisa Caputo
*Assistant Examiner* — Philip Cotey
(74) *Attorney, Agent, or Firm* — B. Aaron Schulman, Esq.; Stites & Harbison, PLLC

(57) ABSTRACT

The invention relates to a submillimeter-sized hot-wire sensor (1) comprising a substrate (10), two support rods (11, 12), a metal wire (13) extending between the two ends of the support rods (11, 12), and electrical contacts (14, 15) disposed on the support rods, said contacts each being linked to one of the ends of the wire (13). The metal wire comprises at least two layers of metal materials, one of said layers being made of a material exhibiting a residual stress under tension and the other layer being made of a material exhibiting a residual stress under compression. The thicknesses of these metal layers are adapted so as to compensate the residual stresses between the various layers.

29 Claims, 3 Drawing Sheets

(51) Int. Cl.
*G01F 1/684* (2006.01)
*G01F 1/692* (2006.01)
*G01P 5/12* (2006.01)

(56) References Cited

U.S. PATENT DOCUMENTS

| | | | | |
|---|---|---|---|---|
| 4,197,360 | A | * | 4/1980 | Throop .......................... 428/660 |
| 4,317,102 | A | * | 2/1982 | Vranas ............................ 29/613 |
| 5,006,421 | A | * | 4/1991 | Yang et al. .................... 428/615 |
| 5,310,449 | A | * | 5/1994 | Henderson ...................... 438/53 |
| 5,313,832 | A | * | 5/1994 | Stephan et al. ............. 73/204.26 |
| 5,780,173 | A | * | 7/1998 | Harrington et al. ........... 428/662 |
| 5,883,310 | A | | 3/1999 | Ho |
| 6,018,861 | A | * | 2/2000 | Sheplak et al. ................. 29/825 |
| 6,422,077 | B1 | | 7/2002 | Krauss et al. |
| 6,613,601 | B1 | | 9/2003 | Krauss et al. |
| 6,923,054 | B2 | | 8/2005 | Liu et al. |
| 2003/0106875 | A1 | * | 6/2003 | Lin et al. ........................... 216/2 |
| 2003/0183000 | A1 | | 10/2003 | Yamada et al. |
| 2004/0113751 | A1 | * | 6/2004 | Timelthaler ................... 338/309 |
| 2004/0144169 | A1 | * | 7/2004 | Popielas et al. .................. 73/200 |
| 2009/0090359 | A1 | * | 4/2009 | Daviet et al. .............. 128/203.14 |
| 2009/0158838 | A1 | * | 6/2009 | Speldrich ..................... 73/272 R |

OTHER PUBLICATIONS

International Search Report for PCT/IB2011/051546 dated Jul. 12, 2011.

Chang Liu et al: "Development and characterization of surface micromachined, out-of-plane hot-wire anemometer", Journal of Microelectromechanical Systems, IEEE Service Center, Piscataway, NJ, US, vol. 12, No. 6, (Dec. 1, 2003), pp. 979-988.

Erm L P: "Modifications to a Constant-Temperature Hot-Wire Anemometer System to Measure Higher-Order Turbulence Terms Using Digital Signal Processing", Internet Citation, (Sep. 1, 1997), p. 4OPP, XP009120987, Retrieved from the Internet: URL:http://www.dtic.mil/cgi-bin/GetTRDoc?AD=ADA335307&Location=U2&doc=Get TRDoc.pdf [retrieved on Aug. 3, 2009] p. 6, line—Line19.

\* cited by examiner

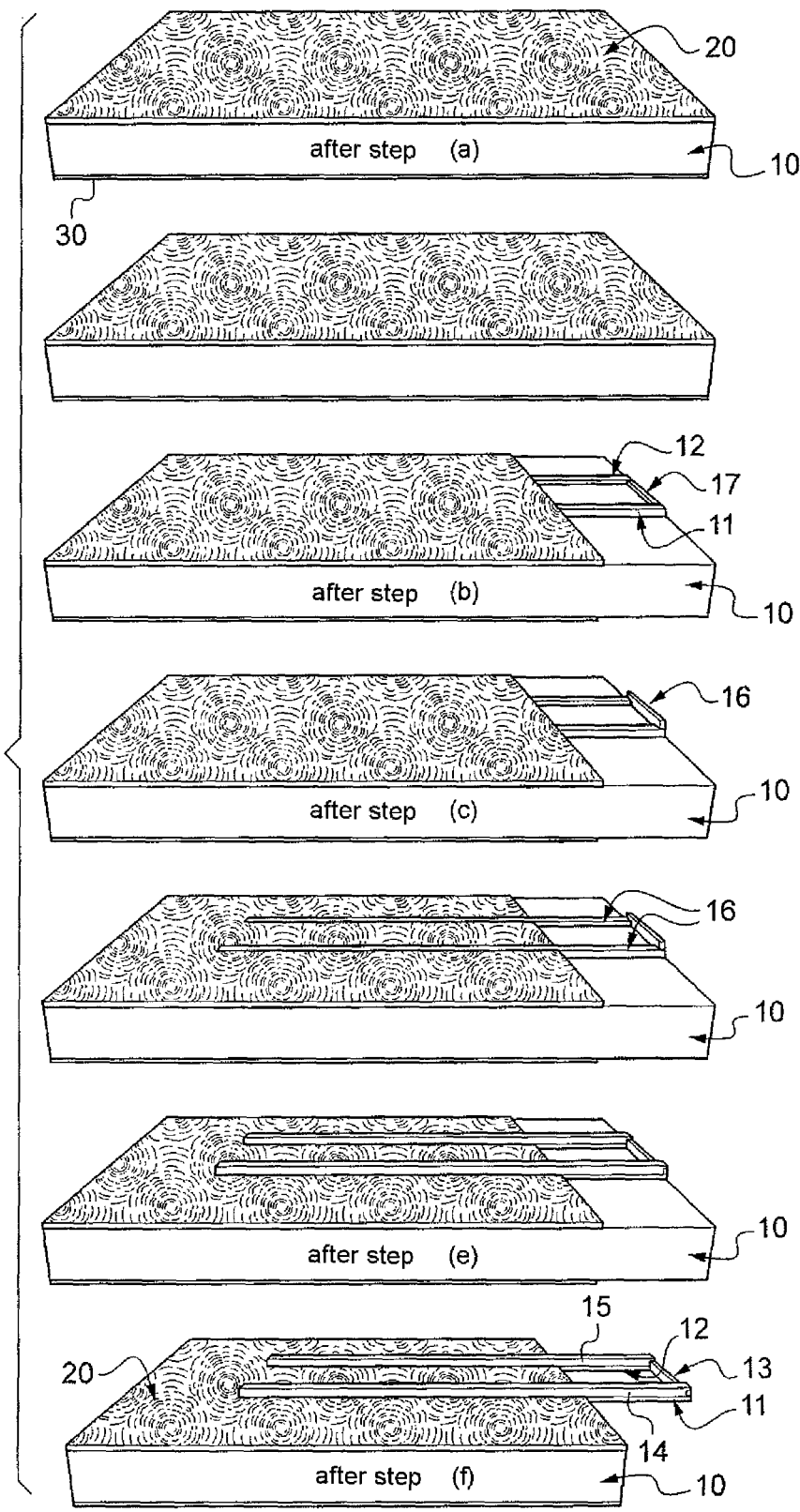

HOT-WIRE SENSOR OF SUBMILLIMETER SIZE AND ASSOCIATED METHOD OF PRODUCTION

The present invention relates to the field of submillimeter-sized hot-wire sensors.

Generally, hot wires are used for carrying out measurements of velocity (anemometer), of parietal friction or of pressure within a flow.

Commercial examples customarily have millimeter-sized lengths and diameters of the order of a few microns (5 microns for example). Decreasing the size of these sensors, in particular their length, would make it possible to reduce flow disturbance, to increase the spatial resolution of the measurement and to be able to carry out measurements in confined zones (within an orifice for example or in microfluidics).

The majority of hot-wire sensors are currently produced by conventional manufacturing techniques.

However, recently, the use of microfabrication technologies of MEMS (Microelectromechanical Systems) type for producing miniaturized hot-wire sensors has been proposed.

One objective pursued by the use of these microfabrication technologies is the production of series of sensors implanted in the surface of structures (aircraft wing model for example) for the purpose of providing information on the near-wall flow. Another objective pursued by these technologies is the use of these sensors for performing a closed-loop control of actuators (also located at the wall) for the purpose of achieving an active control of the flow.

An example of a hot wire of MEMS type is proposed in the article "Development and characterization of surface micromachined, out-of-plane hot-wire anemometer", Jack Chen & Chang Liu, Journal of microelectromechanical systems, vol. 12 (6), December 2003 (D1) or in the corresponding U.S. Pat. No. 6,923,054 (D2) by the same authors.

In these documents, the submillimeter-sized hot wire comprises a silicon substrate, two support rods made of polyimide, a submillimeter-sized metal wire (hot wire) extending between the two ends of the support rods, this wire comprising, in particular, a first layer of platinum, a layer of nickel and a second layer of platinum.

The two support rods extend perpendicular with respect to the front face of the substrate. For this purpose, the support rods are bent at a right angle with respect to the plane of the substrate during the fabrication process.

The metal wire is connected at each of its ends to metal contacts made of gold mounted on the polyimide rods, by means of an adhesion layer made of chromium.

The metal wire is also mounted on an additional mechanical support element, also made of polyimide, which extends between the two support rods. The support of the metal wire on this polyimide mechanical support element is also performed by means of a chromium layer.

The authors have chosen polyimide as support for the hot wire because it is a material that is a poor conductor of heat, which makes it possible to minimize the undesirable losses through the polyimide support and favors the obtaining of precise measurements via the sensitive part of the sensor (hot wire).

The design thus proposed in this document makes it possible to achieve velocity measurements exceeding 5 m/s, without mechanically degrading the sensor.

Thus, at the sensitive part of the sensor, the thickness of the polyimide support has been chosen so as to withstand such velocities. The thickness of the polyimide support must therefore have a minimum value in order to ensure the function of mechanical strength of the hot wire, the latter having a small thickness, namely 0.12 µm.

At the same time, the thickness of the polyimide support must not be too large either since the polyimide would then provide too great a thermal mass, detrimental for the frequency response of the anemometer.

In this particular case, the authors have adopted a polyimide thickness of around 2.7 µm as being an acceptable compromise between the mechanical strength and the frequency response of the anemometer (for example during a sudden change of velocity of the flow).

Indeed, it is noted that the thickness of the polyimide support (2.7 µm), considerably greater than that of the metal layer forming the hot wire (0.12 µm), can only change with difficulty.

As a variant, document D2 (but not document D1) proposes to remove the polyimide support of the hot wire. It therefore envisages a sensor for which the sensitive part (hot wire) is made solely of metal, with no polyimide support.

In this variant, it is understood that the thickness of the metal (0.12 µm) ought to be insufficient for the hot wire to withstand, without breaking, velocities of greater than 5 m/s.

Furthermore, it is understood that the mechanical strength of this hot-wire sensor is also limited by the curvature of the support rods with respect to the substrate.

Indeed, this curvature creates a bending region for the support rods. Furthermore, the stress at this curvature is greater than elsewhere on the support rods.

Due to its design, this hot-wire sensor therefore reveals performance limitations.

This is, for example, the case if it is desired to carry out high velocity measurements (>20 m/s, or even greater than 30 m/s for an air flow) while retaining a precise measurement of this velocity.

When polyimide is provided at the sensitive part of the sensor, one would then be led to increase the thickness of polyimide, which would be detrimental to the precision of the measurement.

This would be even more critical for unsteady flows, insofar as the frequency response of the sensor is limited by the thickness of polyimide.

When only a thickness of metal is provided, without polyimide, at the sensitive part of the sensor, increasing the thickness of metal could be considered.

Unfortunately, this cannot be envisaged due to the residual stresses that exist in the metal. The expression "residual stress" is understood to mean the stress which endures in a material in the absence of any external stress.

Indeed, for a metal layer of large thickness, the residual stresses would result in a curved hot wire being obtained, which cannot be used to carry out precise measurements.

In other words, either the thickness of metal would be small enough to avoid problems of curvature of the hot wire, but then this hot wire would have a mechanical strength unsuitable for velocities of greater than 5 m/s, or the thickness of metal would be large enough to withstand velocities of greater than 5 m/s, but, in this case, the measurements carried out by the sensor would be insufficiently precise.

Moreover, in any case, the thickness of the support rods would also have to be increased in order to prevent any bending of the support rods, or even any mechanical rupture of these rods.

Finally, such a hot wire is, by design, firmly attached to the wall against which the flow takes place, the supports of the hot wire extending out of the plane of the substrate. This hot-wire sensor cannot therefore be moved to any point of the flow, for example to carry out measurements in the vicinity of the wall then at the center of the flow. Indeed, the length of the supports is fixed and this length determines the distance between the wall and the hot wire.

One objective of the invention is thus to overcome at least one of the drawbacks of existing hot-wire sensors.

In particular, one objective of the invention is to propose a submillimeter-sized hot-wire sensor capable of carrying out precise measurements in a flow, in near-wall flow or anywhere in the flow, while being suitable for the existing processing electronics of this type of sensor.

Also in particular, one object of the invention is to produce a submillimeter-sized hot-wire sensor capable of carrying out precise measurements up to high velocities, namely beyond 20 m/s or even beyond 30 m/s.

In order to achieve at least one of these objectives, the invention proposes a submillimeter-sized hot-wire sensor comprising:
- a substrate;
- two support rods, one portion of which is deposited on the substrate and the other portion of which extends beyond said substrate in the continuation thereof;
- a metal wire extending between the two ends of the support rods, this wire being intended to form the hot wire;
- electrical contacts positioned on the support rods, said contacts each being connected to one of the ends of the wire.

The sensor will be able to make provision for other technical features of the invention, taken alone or in combination:
- the support rods are made of nanocrystalline diamond, of silicon (Si) or of silicon carbide (SiC);
- the support rods made of nanocrystalline diamond each have a thickness of less than 3 µm, for example between 100 nm and 3 µm;
- the metal wire comprises at least one of the following metallic materials: Ag, Ti, Cr, Al, Cu, Au, Ni, W or Pt;
- the metal wire comprises at least one layer of nickel coated with at least one layer of tungsten;
- the ratio between the thickness of the nickel layer and that of the tungsten layer is between 2 and 5;
- the thickness of the nickel layer is between 50 nm and 2 µm;
- the metal wire comprises at least one layer of platinum;
- the metal wire comprises a plurality of metal bilayers, each bilayer being formed by two layers made from different metals, for example a layer of nickel coated with a layer of tungsten;
- the metal wire (13) comprises:
  - a first layer of platinum;
  - a plurality of bilayers formed by a layer of nickel coated with a layer of tungsten; and
  - a second layer of platinum;
- the thickness of the metal wire is between 100 nm and 5 µm, preferably between 1 µm and 3 µm;
- the metal wire has a length between 50 µm and 1 mm;
- the metal wire has an ohmic resistance that changes linearly with the temperature and such that it is between 5 ohms and 10 ohms at 20° C. and between 10 ohms and 15 ohms at 200° C.;
- the electrical contacts comprise at least one of the following metallic materials: Ag, Ti, Cr, Al, Cu, Au, Ni, W or Pt;
- a thermally-insulating layer is provided between the metal contacts and the support rods, for example made of silicon dioxide, silicon nitride, ceramic or a polymer material;
- a mechanical reinforcement is provided placed between the support rods and under the metal wire;
- the mechanical reinforcement has a thickness of less than 3 µm, for example between 100 nm and 3 µm.

To achieve at least one of these objectives, the invention also proposes a process for producing a submillimeter-sized hot-wire sensor, comprising the steps consisting, starting from a substrate, in:
(a) depositing, on the front face of the substrate, a layer made of a material intended to form support rods of the sensor;
(b) etching said material deposited in step (a) in order to form at least two support rods;
(c) depositing at least one layer of metallic material between the ends of the support rods etched in step (b) in order to form a metal wire;
(d) annealing the metal wire deposited in step (c);
(e) depositing one or more layers of metal on the support rods in order to form electrical contacts, so that each contact is connected to one of the ends of the metal wire;
(f) etching the support in order to free a portion of the support rods from the substrate.

This process could also include the following steps, taken alone or in combination:
- step (a) consists in growing a layer of nanocrystalline diamond on the front face of the substrate;
- step (a) comprises steps consisting in:
  - ($a_1$) preparing a colloidal solution of nanometer-sized diamond crystallites diluted, for example in water;
  - ($a_2$) placing the substrate in said solution;
  - ($a_3$) subjecting the substrate thus immersed in this solution to ultrasounds;
- step (b) comprises the etching of a mechanical support extending between the two rods, intended for the mechanical support of the metal wire;
- step (c) is carried out by a lift-off process with a cap profile;
- step (d) is carried out at a temperature between 200° C. and 700° C. for a duration between 15 min and 45 min;
- step (e) consists in:
  - ($e_1$) depositing a seed layer, for example by spraying, on the support rods; then
  - ($e_2$) depositing at least one layer of metallic material by electrolysis onto the seed layer deposited in step ($e_1$), and optionally other metallic layers onto the first metallic layer;
- step (f) is carried out by chemical etching, for example by wet etching in a bath of KOH or by gas-phase etching in $XeF_2$;
- step (f) is carried out by physicochemical etching, for example plasma etching of Bosch DRIE type;
- an additional step consisting in depositing a thermally-insulating layer on the rods, and on the substrate, in the continuation of said rods, is provided before step (e).

Other features, objectives and advantages of the invention will be stated in the detailed description below given with reference to the following figures.

Figures 6A, 6B:
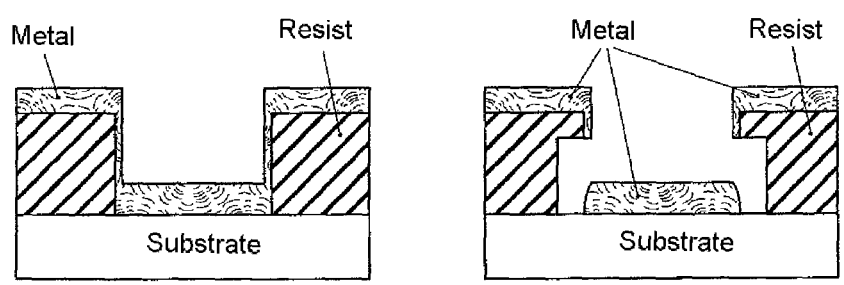

FIG. 6, which includes FIGS. 6(a) and 6(b), represents in FIG. 6(b) a particular profile used for carrying out a step of depositing at least one metal layer intended to form the hot wire according to the invention, FIG. 6(a) representing a conventional profile provided by way of reference;

FIG. 7 represents intermediate structures obtained via the implementation of a process for producing the sensor according to the invention.

Figure 1:
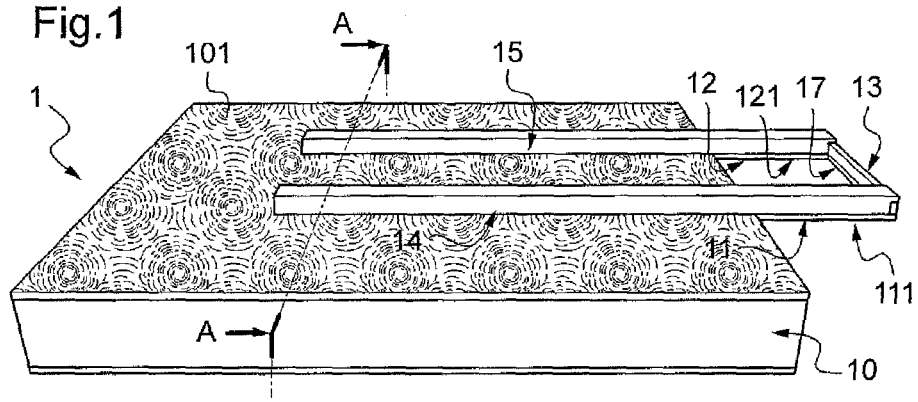
FIG. 1 is a diagram representative of a hot-wire sensor according to the invention.
Figure 2:
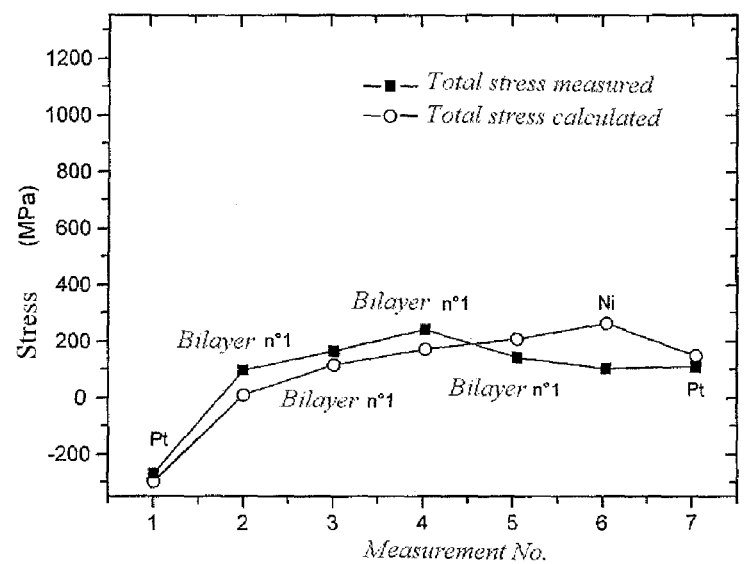
FIG. 2 represents the change in the total residual stress of a multilayer of metallic materials that is capable of forming the hot wire of the sensor according to the invention as it is produced.

A submillimeter-sized hot-wire sensor according to the invention is shown schematically in FIGS. 1 and 2. This hot-wire sensor 1 comprises a substrate 10 and two support rods 11, 12, one portion of which 110 is deposited on the substrate 10 and the other portion of which 111, 121 extends beyond said substrate 10 in the continuation thereof.

The portions 111, 121 are therefore located in the continuation of the portions of the rod that are located on the front face 101 of the substrate 10.

The substrate 10 may be made of silicon. Any other material used as substrate would also be likely to be suitable.

The support rods 11, 12 may be made of nanocrystalline diamond. In this case, these rods 11, 12 may each have a small thickness, of less than 3 μm and for example between 100 nm and 3 μm while providing a mechanical support role. Indeed, the nanocrystalline diamond has advantageous mechanical properties combined with a low thermal expansion coefficient. Thus, its Young's modulus is around 1100 GPa, its yield strength is around 53 GPa and its thermal expansion coefficient is around 1 ppm/° C.

As a variant, the support rods 11, 12 may be made of silicon (Si) or of silicon carbide (SiC).

The portion 111, 121 of the support rods 11, 12 which extends beyond the substrate 10 has a width which decreases with the increase of the distance with respect to the substrate (not represented). This makes it possible to limit the intrusive effect of the support rods on moving away from the substrate, that is to say from the wall along which the flow for which it is desired to know certain characteristics (velocity, for example) takes place.

The sensor 1 also comprises a submillimeter-sized metal wire 13 extending between the two ends of the support rods 11, 12, this wire being intended to form the hot wire.

The metal wire 13 could be constituted of at least one metallic material among the following: Ag, Ti, Cr, Al, Cu, Au, Ni, W or Pt.

Preferably, the metal wire 13 will comprise at least two layers of metallic materials, one of which is made of a material having a residual tensile stress and the other of which is made of a material having a residual compressive stress.

The residual stress refers to the stress which endures in a material in the absence of any external stress.

For example, the metal wire 13 comprises at least one layer of nickel (Ni) coated with at least one layer of tungsten (W).

Nickel has a residual tensile stress and tungsten a residual compressive stress, the values of which are dependent however on the deposition conditions.

A first test was carried out in order to determine these residual stresses. The applicant thus measured the residual stress of the nickel by depositing, full-wafer scale, a layer of nickel on a silicon substrate. The applicant also measured the residual stress of the tungsten by depositing, full-wafer scale, a layer of tungsten on a substrate identical to the substrate used with the nickel.

In both cases, the layer of metal deposited (Ni or W) is a thin layer relative to the dimensions of the substrate.

Furthermore, the depositions were carried out by sputtering.

This technique uses a plasma of inert gas, such as argon, in order to sputter a target of the material to be deposited (Ni or W). The argon pressure used is between 0.9 Pa (i.e. a flow rate of argon of 25 sccm, namely 25 cm$^3$/min with the chamber used) and 3.1 Pa (i.e. a flow rate of argon of 110 sccm with this same chamber).

The plasma is created between the target (negatively polarized) and the substrate (positively polarized), and thus the atoms torn from the target are directed toward the substrate. The plasma was densified and concentrated using the magnetic field created by a magnetron in order to increase the rate of the depositions. The RF power chosen is 300 W.

In the range of inert gas pressures between 1.2 Pa and 3.1 Pa, the applicant observed that the residual tension in the nickel did not change very significantly and had an absolute value varying around 550 MPa. Furthermore, in the range of inert gas pressures between 0.9 Pa and 3.1 Pa, the applicant observed that the residual compression in the tungsten did not change very significantly and had an absolute value varying around 1250 MPa.

In order to compensate for the residual stresses of the nickel layer with that of the tungsten layer, it would therefore appear that the thickness of the nickel layer must be greater than the thickness of the tungsten layer.

One parameter that is involved in the control of the thickness of the layers is the deposition time of each layer.

More specifically, the exact ratio between the thickness of the layer of nickel and that of tungsten in order to minimize the total residual stress depends on the deposition conditions of these layers (power of the magnetron, inert gas pressure, deposition time) but also on the number of Ni/W bilayers that the metal wire intended to form the hot wire is capable of comprising.

A compensation of the residual stresses between the various metal layers of the wire may be deemed acceptable when the total residual stress of the metal wire is below a limiting value $C_{lim}$. For example, this limiting value may be equal to $C_{lim}$=250 MPa, and preferably $C_{lim}$=200 MPa.

This compensation of the residual stresses is important. Indeed, a residual stress above the limiting value would mean a curved shape of the hot wire between the two support rods 11, 12. Such a shape renders the sensor 1 unusable for carrying out precise measurements of the physical quantity that it is intended to measure within the flow (velocity, pressure or parietal stress).

The applicant thus carried out a second test for a metal wire comprising several nickel/tungsten bilayers.

A metal wire intended to form a hot wire comprising in particular a first layer of platinum, a plurality of bilayers formed by a layer of nickel coated with a layer of tungsten, and a second layer of platinum, was thus tested. The deposition of several successive bilayers makes it possible to compensate for the residual stress gradually until the desired thickness is obtained.

The layers of platinum thus completely protect the nickel and tungsten against oxidation phenomena.

More specifically, the composition of the metal wire tested is provided in table 1 below, with the deposition times associated with the thicknesses of the various metal layers of the wire.

TABLE 1

| Material | Measurement point | Deposition time | Thickness |
|---|---|---|---|
| Pt | P9 | 2 min | 300 nm |
| Ni | P8 | 50 min | 250 nm |
| W | P7 | 1 min | 65 nm |
| Ni |  | 50 min | 250 nm |
| W | P6 | 1 min | 65 nm |
| Ni |  | 50 min | 250 nm |
| W | P5 | 1 min | 65 nm |
| Ni |  | 50 min | 250 nm |
| W | P4 | 1 min | 65 nm |
| Ni | P3 | 50 min | 250 nm |
| Pt | P2 | 2 min | 300 nm |
| Ti | P1 | 50 s | 50 nm |

The first layer deposited on the substrate is a layer of titanium (Ti). It is coated with a first layer of platinum (Pt), with four Ni/W bilayers, with a layer of nickel and with a second layer of platinum. The thickness of the metal layer thus obtained is 2.16 μm.

The means used for the deposition are the same as those mentioned previously. Thus, use is made of argon as inert gas and a magnetron set at the same power.

The residual stresses of each layer were adjusted by playing with two parameters, namely the flow rate of argon (that is to say the pressure of argon in the chamber) and the deposition time.

The flow rate of argon used for the deposition of a layer of nickel is 45 sccm (pressure of 1.5 Pa approximately). For a layer of tungsten, it is 85 sccm (pressure of 2.66 Pa). Finally, for a layer of platinum, it is 25 sccm (pressure of 0.9 Pa). The deposition times are themselves specified in table 1.

FIG. 2 represents the change in the total residual stress of the metal layer as a function of the measurement number.

As can be seen, this total residual stress depends in particular on the number of Ni/W bilayers provided. The wire corresponding to the structure of table 1 finally has a measured total residual stress of around 170 MPa.

In order to measure this total residual stress, a profilometer is used. To carry out the measurement, the chamber is emptied of its neutral atmosphere and vented to the atmosphere. However, the applicant observed during measurement No. 5 that the layer of tungsten of bilayer No. 3 (measurement point No. 4) was oxidized, probably following too long an exposure to ambient air during measurement No. 4. This certainly skewed the measurements of measurement points No. 5 and No. 6.

The applicant therefore sought to verify this aspect.

Table 2 specifies the residual stress values measured respectively for a layer of platinum (Pt), a layer of nickel (Ni) or a layer of tungsten (W) for the flow rates of argon and thicknesses of layers (therefore deposition times) mentioned in table 1.

TABLE 2

| Material | Flow rate (sccm) | Deposition time (min) | Thickness (nm) | Stress (MPa) |
|---|---|---|---|---|
| Pt | 25 | 2 | 300 | −550 |
| Ni | 45 | 50 | 250 | 600 |
| W | 85 | 1 | 65 | −600 |

However, it is known to a person skilled in the art that by producing a multilayer for which the total thickness remains thin relative to that of the substrate, it is possible to approximate the total residual stress ($\sigma_{total}$) present in the multilayer by the sum of the stresses in each layer ($\sigma_{layer,i}$) weighted by their thickness relative to the total thickness ($t_{layer,i}/t_{total}$) as shown in the following equation.

$$\sigma_{total} = \sum_{i=1}^{n} \sigma_{layer,i} \frac{t_{layer,i}}{t_{total}} \quad (R1)$$

The calculations made with the equation R1 and the data from table 2 applied to table 1 are mentioned in FIG. 2.

These calculations effectively show that the measurement points No. 5 and No. 6 have been skewed by the oxidation of tungsten during measurement No. 4, by profilometer, of the total residual stress.

Ultimately, these tests finally show that the structure of the metal wire from table 1, namely a structure of the wire comprising several nickel/tungsten bilayers, may be envisaged while retaining a total residual stress below the required limit $C_{lim}$.

These tests also show that, generally, there is no advantage either in providing too large a number of Ni/W bilayers in order to retain a total residual stress below this limiting value $C_{lim}$.

As can be seen, the ratio between the thickness of the nickel layer and that of the tungsten layer is 3.85 in this particular case (tables 1 and 2).

More generally, this ratio could however be between 2 and 5.

Furthermore, the thickness of the nickel layer may be between 50 nm and 2 μm. As a function of the ratio between the thicknesses of the nickel and tungsten layers mentioned above, this makes it possible to deduce therefrom the thickness of a corresponding tungsten layer.

The metal wire 13 will generally comprise two layers of platinum, between which the Ni/W bilayers will be placed in order to protect the latter against oxidation phenomena.

The thickness $e_{wire}$ of the metal wire 13 may be between 100 nm and 5 μm, for example between 150 nm and 3 μm and preferably between 1 μm and 3 μm.

Its length $L_{wire}$ may be between 50 μm and 1 mm.

Its width $l_{wire}$ may vary, but will generally be around a few microns, for example in the vicinity of 5 μm.

In any case, in order to optimize the operation of the hot-wire sensor 1, it is necessary to take values of the length $L_{wire}$ of the metal wire 13 that are as high as possible and values of the hydraulic diameter $d_h$ of the wire 13 that are as low as possible.

The hydraulic diameter $d_h$ is defined by the equation: $d_h=4S/P$ where S is the cross section of the hot wire 13 and P its wetted perimeter. If it is assumed that the metal wire 13 is of square cross section, then the hydraulic diameter is equivalent to its side.

The hydraulic diameter may be different, for example when the metal wire 13 has a rectangular shape and/or is supported by a mechanical reinforcing element 17 that extends between the two support rods 11, 12. This reinforcing element 17 is described below.

In reality, it is known by a person skilled in the art that the relationship: $L_{wire}/d_h \geq 30$ must be respected in order to ensure a reliable measurement of the physical quantity to be measured with the hot wire.

It is also preferable, for a hot-wire sensor 1, to use materials having a relatively high thermal conductivity for the sensitive element, in order to achieve a good frequency response and a low thermal conductivity for the support elements, in order to avoid parasitic heat losses. The choice of a metal is not a priori the most relevant regarding this point. However, in the family of metals, nickel and tungsten have moderate thermal conductivities. Specifically, nickel has a thermal conductivity of 91 W·m$^{-1}$·K$^{-1}$ and tungsten a thermal conductivity of 173 W·m$^{-1}$·K$^{-1}$.

One of the reasons why a metallic material is chosen to form the hot wire is specified below.

For a hot-wire sensor, one important aspect is to know the change in the ohmic resistance R(T) of the wire with temperature. This ohmic resistance depends on the nature of the materials forming the wire.

Indeed, hot-wire sensors seek to maintain either a constant temperature at their interface with the fluid medium, or a constant heat flow through this interface. Thus, irrespective of the case considered, it is necessary to adjust the power dissipated by the Joule effect in the metal wire 13 in order to maintain this interface temperature (or heat flow). However, the power dissipated by the Joule effect depends on the ohmic resistance of the wire 13, which itself depends on the (average) temperature of this wire.

In a metal wire, the ohmic resistance R(T) may be expressed in the form:

$$R(T) = R_0[1 + \alpha_0(T - T_0)] \qquad (R2)$$

where:
$T_0$ is a reference temperature, $\alpha_0$ is the temperature coefficient of resistance at the temperature $T_0$ and $R_0$ is the ohmic resistance of the wire at the temperature $T_0$.

The temperature coefficient of resistance α is also known under the acronym TCR for Temperature Coefficient Resistance.

Under these conditions, determining the change in the ohmic resistance of the metal wire as a function of the temperature boils down to determining its resistance $R_0$ at a reference temperature $T_0$ and its temperature coefficient of resistance $\alpha_0$ at this reference temperature.

The applicant carried out a test with a metal wire, the composition of which is provided in table 3 below, with the deposition times associated with the thicknesses of the various metal layers of the wire. The thickness of the metal wire thus tested is 2.35 μm.

TABLE 3

| Order | Material | Deposition time | Thickness |
|---|---|---|---|
| 1 | Ti | 50 s | 50 nm |
| 2 | Pt | 2 min | 300 nm |
| 3-4 | Ni—W | 4*10 min-2 min | 200 nm-100 nm |
| 5-6 | Ni—W | 4*10 min-2 min | 200 nm-100 nm |
| 7-8 | Ni—W | 4*10 min-2 min | 200 nm-100 nm |
| 9-10 | Ni—W | 4*10 min-2 min | 200 nm-100 nm |
| 11-12 | Ni—W | 4*10 min-2 min | 200 nm-100 nm |
| 13 | Ni | 4*10 min | 200 nm |
| 14 | Pt | 2 min | 300 nm |

The means used for the deposition of these layers are those presented above.

Furthermore, the multilayer thus deposited was annealed under vacuum for 30 minutes, at 550° C. and with a controlled temperature rise (increment of 50° C./min) and also a natural cooling.

The vacuum annealing is important to prevent oxidation of the tungsten layer, which is the limiting element among the nickel, tungsten and platinum.

Figure 3:
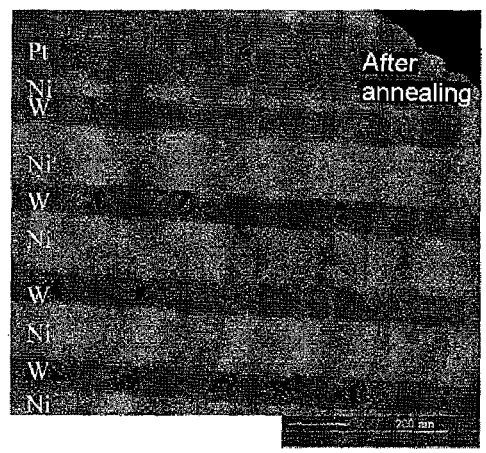
FIG. 3 represents a scanning transmission electron microscopy view of a multilayer of metallic materials that is capable of forming the hot wire of the sensor according to the invention.

The structure from table 3 obtained after annealing is shown in FIG. 3.

Figure 4:
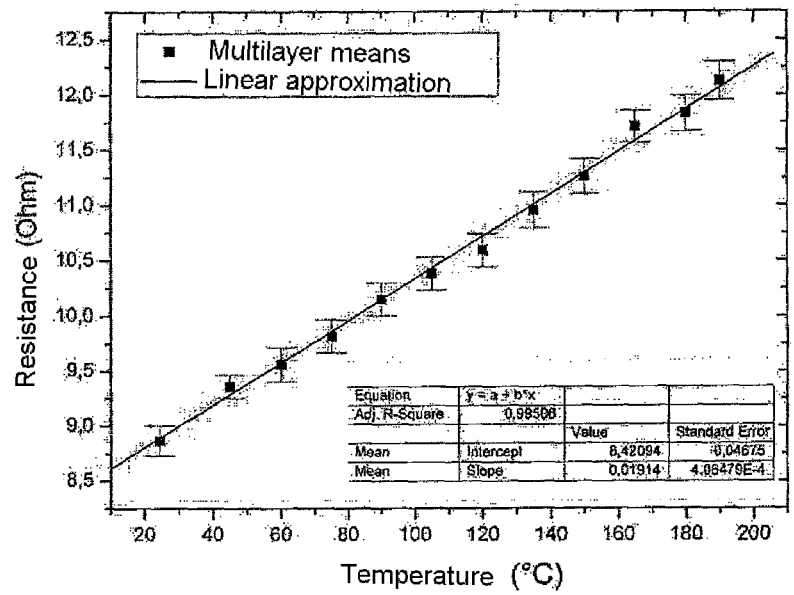
FIG. 4 represents the change in the ohmic resistance of a multilayer of metallic materials as a function of temperature.

Results are provided in FIG. 4, with the linear regression that accompanies it.

Taking into account the equation (R2), the slope of the linear regression is defined by the product $\alpha_0 R_0$ and its ordinate at the origin by $R_0 - \alpha_0 T_0$, the origin corresponding to the reference temperature $T_0 = 0°$ C. It is then possible to deduce therefrom the values of $\alpha_0$ and $R_0$.

In order to obtain the temperature coefficient of resistance at a reference temperature $T_{20}$ corresponding to ambient temperature of 20° C., then use is made of the following equation (R3):

$$\alpha_{20} = \alpha_0 \frac{R_0}{R_{20}} \qquad (R3)$$

$\alpha_0$ and $R_0$ being known and $R_{20}$ being able to be read directly on the curve from FIG. 2.

Thus, the metal wire, the composition of which is provided in table 1, has a temperature coefficient of resistance at 20° C., $\alpha_{20}$, of 2175 ppm/° C. The resistance R(T) changes between 8.7Ω at 20° C. and 12.3Ω at 200° C.

Taking into account the dimensions of the metal wire from table 3, the applicant then determined the electrical resistivity ρ of this wire at 8.6 μΩ·cm approximately.

These resistance values are relatively low. They enable use with the existing processing electronics on the market for hot-wire sensors, for example a Streamline® electronic assembly for anemometry at constant temperature from the company Dantec. Indeed, the sensors sold by this company have ohmic resistances generally below 30 ohms. When these sensors have a resistance below 30 ohms, they may be directly connected to the electronic assembly. Between 30 ohms and 100 ohms, they must be connected to the electronic assembly by means of an adjustable external resistor.

The value of this temperature coefficient of resistance is lower than the known values of the temperature coefficient of resistance for nickel, tungsten and platinum. Similarly, the value of the resistivity is lower than the known values for nickel, tungsten and platinum.

In order to ensure this result, the applicant therefore carried out tests under the same operating conditions (deposition, annealing) for, respectively, a nickel layer, a tungsten layer and a platinum layer on an identical substrate.

Table 4 below specifies the deposition times associated with the thicknesses of the various metal layers.

TABLE 4

| Material | Deposition time | Thickness |
|---|---|---|
| Pt | 3 min | 380 nm |
| W | 5 min | 330 nm |
| Ni | 3*20 min | 310 nm |

The linear regression method presented above then made it possible to result in the following data for the temperature coefficient of resistance at 20° C.:

Nickel: $\alpha_{20}$=5000 ppm/° C.;
Tungsten: $\alpha_{20}$=3375 ppm/° C.; and
Platinum: $\alpha_{20}$=5750 ppm/° C.

Furthermore, taking into account the dimensions of the metal layers thus deposited, the resistivity was measured at:

ρ=24.3 μΩ·cm for nickel;
ρ=28.7 μΩ·cm for tungsten; and
ρ=20 μΩ·cm for platinum.

It may actually be noted that the temperature coefficient of resistance obtained with the metal wire, the composition of which is given in table 3, is substantially below those obtained, under the same operating conditions, with any one of the metals Ni, W or Pt taken in isolation.

Ultimately, the resistance of the metal wire linearly, in accordance with the equation R2. Besides the example provided previously, it is possible to consider that the change in the ohmic resistance of this wire will be linear and such that it is between 5 ohms and 10 ohms at 20° C. and between 10 ohms and 15 ohms at 200° C.

The sensor 1 according to the invention also comprises metal contacts 14, 15 placed on the support rods 11, 12, said contacts each being connected to one of the ends of the metal wire 13 forming the hot wire.

The metal contacts 14, 15 may comprise at least one of the following materials: Ag, Ti, Cr, Al, Cu, Au, Ni, W or Pt.

In particular, the metal contacts 14, 15 may have a structure and a composition which are identical to those of the metal wire 13. In this case, the metal contacts 14, 15 may in particular comprise at least one layer of nickel coated with a layer of tungsten, these layers optionally being placed between a first layer of platinum (lower layer) and a second layer of platinum (upper layer). Also for example, the metal contacts 14, 15 may have the structure from table 1 or from table 3.

A mechanical reinforcing element 17 may be provided between the ends of the support rods 11, 12, under the metal wire 13. This mechanical reinforcement 17 has a thickness of less than 3 μm, for example between 100 nm and 3 μm. The nature of the material may, for example, be the same as that forming the support rods 11, 12.

Figure 5:
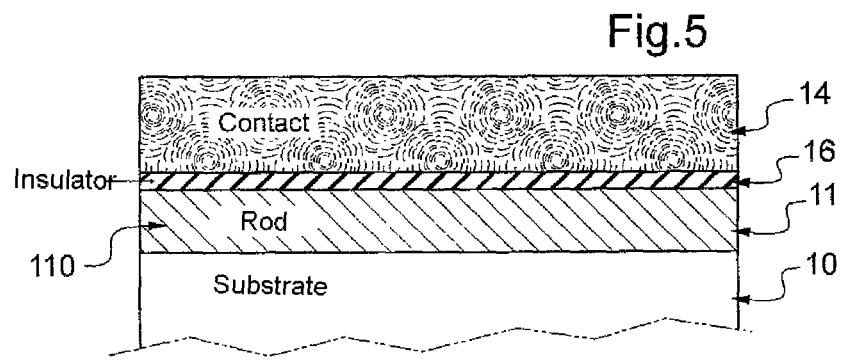
FIG. 5 is a partial cross-sectional view along the cross section A-A represented in FIG. 1.

A thermally insulating layer 16 may be provided between the metal contacts 14, 15 and the support rods 11, 12. This layer is represented in FIG. 5, in cross-sectional view. This layer may, for example, be made of silicon dioxide, of silicon nitride, of ceramic or of a polymer material.

This thermally insulating layer 16 is in particular useful when the material forming the support rods 11, 12 is a thermally conducting material.

This is, for example, the case for diamond which has a thermal conductivity between 500 $W \cdot m^{-1} \cdot K^{-1}$ and 2000 $W \cdot m^{-1} \cdot K^{-1}$.

In general, nanocrystalline diamond has a thermal conductivity in the vicinity of 500 $W \cdot m^{-1} \cdot K^{-1}$, whereas single-crystal diamond has a thermal conductivity in the vicinity of 2000 $W \cdot m^{-1} \cdot K^{-1}$.

The expression "nanocrystalline diamond" is understood to mean a diamond having crystals that do not generally exceed 100 nm, even if certain crystals (in a small amount) may have a dimension ranging beyond 100 nm. More specifically, the size of the crystals may be between 1 nm and 100 nm.

Depending on the nature of the diamond used, a thermally insulating layer 16 may be added in order to limit the heat losses and a possible bias in the measurement of the physical quantity that it is desired to measure with the sensor, the velocity for example.

This thus makes it possible to find an advantageous compromise between the sensitivity of the sensor and its frequency response.

Furthermore, provision may also be made for this thermally insulating layer 16 to completely cover the metal contacts 14, 15.

In order to produce the hot-wire sensor according to the invention, the following steps are provided:

(a) depositing, on the front face of the substrate, a layer 20 made of a material intended to form support rods of the sensor;

(b) etching said material deposited in step (a) in order to form at least two support rods;

(c) depositing at least one layer of metallic material between the ends of the support rods etched in step (b) in order to form a metal wire;

(d) annealing the metal wire deposited in step (c);

(e) depositing one or more layers of metal on the support rods in order to form metal contacts, so that each contact is connected to one of the ends of the metal wire;

(f) etching the support in order to free a portion of the support rods from the substrate.

Step (a) may consist in growing a layer of nanocrystalline diamond on the front face of the substrate.

Diamond is a material that offers a high mechanical strength. Depending on the deposition conditions and the deposition technique, it is possible to obtain nanocrystalline, polycrystalline or single-crystal diamond.

In the case of nanocrystalline diamond, the surface roughness is generally low and is ready for the implementation of step (b). However, prior to step (b), a step may be provided that aims to modify the surface roughness, such as a mechanical polishing or a plasma treatment.

Indeed, it should be noted that the physicochemical properties of these films depend on their crystallography. For example, the size of the crystals must be low enough in order to obtain a low surface roughness with respect to the thickness of the layer of diamond deposited.

Failing that, the surface roughness of the diamond would probably be passed on to the other layers. Thus, the metal wire 13 could also have a high surface roughness, capable of skewing the measurements of physical quantities to be carried out by the hot-wire sensor.

However, diamond has a different lattice parameter to that of the substrate, for example made of silicon. In order to adapt the lattice parameter of the diamond to that of the substrate, it is then necessary to control the nucleation density and the conditions for deposition of diamond on the substrate.

By this means, the size of the nanocrystals during growth is controlled.

The control of the nucleation density at the surface of the substrate may be carried out as follows.

Nanometer-sized diamond crystallites are dispersed on the substrate using colloidal solutions diluted in water. The substrate is then placed in an ultrasonic bath with these elements in suspension. The ultrasounds give rise to the deposition of the crystallites on the substrate, the density of which may be greater than $10^{11}$ cm$^{-2}$.

This technique has the advantage of being able to treat three-dimensional surfaces, while preserving said surfaces (unlike mechanical techniques for example). The surface of the substrate is thus preserved for the actual deposition of the diamond layer.

Deposition conditions that can be envisaged for the diamond layer are mentioned below.

The growth of the diamond layer takes place at a pressure below atmospheric pressure and at a moderate temperature below 1000° C., using a stream of carbon-containing gas borne by an inert gas which is dissociated using an energy source. The carbon-containing gas may be methane. The inert gas may be hydrogen. The energy source may be a microwave generator, a heating filament or any equivalent means.

For example, it is possible to use an Astex AX6550 CVD deposition reactor enhanced with an $H_2/CH_4$ plasma maintaining a methane concentration always below 3%. The microwave energy source is chosen at 2.45 GHz, and its power set at 3.5 kW approximately. The pressure in the chamber was chosen at 30 Torr and the temperature of the substrate was maintained at 700° C. using a Williamson Pro 92 dual-wavelength pyrometer.

When step (a) consists in growing a nanocrystalline diamond, step (b) may then be carried out under a high-energy $O_2$ reactive plasma, that is to say for an RF power of several kW minimum. Step (b) may also comprise, in addition to the etching of the support rods 14, 15, the etching of the mechanical reinforcing element 17 extending between the two rods 14, 15 and that is intended to be placed under the metal wire 13.

Step (c) may be carried out by a lift-off process with a cap-shaped profile. This photolithography process consists in firstly defining the patterns in a photoresist with a cap profile, depositing the metal then removing the resist in order to reveal the patterns. FIG. 6(b) represents a cap profile and FIG. 6(a) a straight profile provided by way of comparison.

The operating conditions during this step (c) may especially be those described above for the production of the multilayers of metallic materials provided in table 1 or 3.

Step (d) may consist of a vacuum annealing for a time between 15 min and 45 min at 550° C. and a natural cooling. The temperature rise is controlled, for example with an increment of 50° C./min.

More generally, the annealing temperature must be above the operating temperature of the hot wire. Under these conditions, the annealing temperature may be between 200° C. and 700° C. In particular, it will be noted that it is thus possible to produce a submillimeter-sized hot-wire sensor that operates at temperatures greater than or equal to 400° C. The materials used make it possible in effect to carry out the annealing at a temperature in particular between 400° C. and 700° C.

Furthermore, the temperature rise must be gradual with a maximum step of 100° C./min.

Neither the thickness of metal intended to form the hot wire nor the number of layers forming the latter influences the implementation parameters of the annealing step.

Step (e) may consist in carrying out the following two steps:
($e_1$) depositing a seed layer, for example by spraying, on the support rods; then
($e_2$) depositing at least one layer of metallic material by electrolysis onto the seed layer deposited in step ($e_1$), and optionally other metallic layers onto the first metallic layer.

When several metal layers are provided, as for the structures from table 1 or 3, step ($e_2$) consists more specifically in successively depositing the layers of metallic material by electrolysis, the first metal layer being deposited on the seed layer.

Step (f) may be carried out on the rear face alone, on the front face alone or by a combination of the two.

Step (f) may be carried out by chemical etching, for example by wet etching in a bath of KOH or by gas-phase etching in $XeF_2$.

As a variant, step (f) may be carried out by physicochemical etching, for example plasma etching of Bosch DRIE type.

Also as a variant, step (f) may be carried out by any one of the combinations of the chemical and physicochemical techniques mentioned above.

Thus, it is especially possible to perform a first step ($f_1$) consisting in carrying out a plasma etching of Bosch DRIE type of the rear face side of the substrate, then a second step ($f_2$) consisting in performing a gas-phase etching in $XeF_2$ of the front face side of the substrate.

Step ($f_2$) facilitates the freeing of the support rods 11, 12 and of the whole of the accompanying structure (metal contacts 14, 15, metal wire 13), while avoiding any delamination.

Before step (e), it is possible to provide an additional step that consists in depositing a thermally insulating layer 16 on the rods and on the substrate, in the continuation of said rods.

This thermally insulating layer 16 is, for example, useful when the material deposited during step (a) is thermally conductive. This is for example the case for nanocrystalline diamond.

By way of example, various intermediate structures obtained in the production of a hot-wire sensor in accordance with the invention have been represented in FIG. 7. The sensor 1 finally obtained comprises a thermally insulating layer 16 between the support rods 11, 12 and the metal contacts 14, 15. Furthermore, this sensor 1 also comprises a mechanical reinforcement 17 placed under the metal wire 13, between the two support rods 11, 12.

It should be noted that the structures represented in FIG. 7 reveal a layer 30 made of aluminum that acts as a mask for the etching of the Bosch DRIE process.

It should finally be noted that the sensor represented in FIG. 1, obtained by the above process, may appear in a variety of different forms.

For example, it is possible to have several hot wires in series on the substrate 10 in order to carry out velocity mapping along the flow. It is also possible to have several hot wires in parallel in order to carry out vorticity measurements. It is again possible to have at least two wires oriented perpendicular to one another in order to obtain measurements of various components of the velocity.

The hot-wire sensor according to the invention could be adapted for carrying out parietal stress measurements or pressure measurements.

Among the many advantages that the invention provides, it will be noted that the hot-wire sensor makes it possible to carry out precise near-wall measurements or measurements at the center of the flow.

Indeed, the substrate may be firmly attached to a means for moving the sensor anywhere in the flow, unlike existing submillimeter-sized hot-wire sensors, cf. for example, document D1 or D2.

Moreover, precise measurements may be obtained at high velocities, namely above 20 m/s or even above 30 m/s owing to the choices made for the design of the sensor.

These choices in particular concern the thickness of the metal wire, which may be obtained by a multilayer deposition, the optional choice of nanocrystalline diamond and/or the nature of the support rods.

These choices also concern the fact that a portion of the support rods extends beyond said substrate in the continuation thereof, unlike the sensor disclosed in document D1 or D2. The support rods therefore do not have any curved region likely, at best, to bend in a high velocity flow and at worst to break.

The invention claimed is:

1. A submillimeter-sized hot-wire sensor comprising:
a substrate;
two support rods made of nanocrystalline diamond, one portion of which is deposited on the substrate and the other portion of which extends beyond said substrate in the continuation thereof;
a metal wire capable of forming the hot wire, said metal wire extending between the two ends of the support rods and comprising at least two layers of metallic materials, one of which is made of a material having a residual tensile stress and the other of which is made of a material having a residual compressive stress, the thicknesses of these metal layers being suitable for compensating for the residual stresses between the various layers in order to obtain a total residual stress of the metal wire below a limiting value; and electrical contacts positioned on the support rods, said contacts each being connected to one of the ends of the wire.

2. The submillimeter-sized hot-wire sensor as claimed in claim 1, wherein the support rods made of nanocrystalline diamond each have a thickness of less than 3 μm.

3. The submillimeter-sized hot-wire sensor as claimed in claim 1, wherein said at least two layers of metallic materials of the metal wire are each made with at least one of the following metallic materials: Ag, Ti, Cr, Al, Cu, Au, Ni, W or Pt.

4. The submillimeter-sized hot-wire sensor as claimed in claim 1, wherein the metal wire comprises at least one layer of nickel coated with at least one layer of tungsten, the ratio between the thickness of the nickel layer and that of the tungsten layer being between 2 and 5.

5. The submillimeter-sized hot-wire sensor as claimed in claim 4, wherein the thickness of the nickel layer is between 50 nm and 2 μm.

6. The submillimeter-sized hot-wire sensor as claimed in claim 1, wherein the metal wire comprises at least one layer of platinum.

7. The submillimeter-sized hot-wire sensor as claimed in claim 1, wherein the metal wire comprises a plurality of metal bilayers, each bilayer being formed by a layer made of a material having a residual tensile stress and another layer made of a material having a residual compressive stress, the thicknesses of these metal layers being suitable for compensating for the residual stresses between the various layers in order to obtain a total residual stress of the metal wire that is below the limiting value.

8. The submillimeter-sized hot-wire sensor as claimed in claim 7, wherein the metal wire comprises:
a first layer of platinum;
a plurality of bilayers formed by a layer of nickel coated with a layer of tungsten; and
a second layer of platinum.

9. The submillimeter-sized hot-wire sensor as claimed in claim 1, wherein the thickness of the metal wire is between 100 nm and 5 μm.

10. The submillimeter-sized hot-wire sensor as claimed in claim 1, wherein the metal wire has a length between 50 μm and 1 mm.

11. The submillimeter-sized hot-wire sensor as claimed in claim 1, wherein the metal wire has an ohmic resistance that changes linearly with the temperature and such that it is between 5 ohms and 10 ohms at 20° C. and between 10 ohms and 15 ohms at 200° C.

12. The submillimeter-sized hot-wire sensor as claimed in claim 1, wherein the electrical contacts comprise at least one of the following materials: Ag, Ti, Cr, Al, Cu, Au, Ni, W or Pt.

13. The submillimeter-sized hot-wire sensor as claimed in claim 1, wherein a thermally-insulating layer is provided between the metal contacts and the support rods.

14. The submillimeter-sized hot-wire sensor as claimed in claim 1, wherein a mechanical reinforcement is provided between the support rods and under the metal wire.

15. The submillimeter-sized hot-wire sensor according to claim 14, wherein the mechanical reinforcement has a thickness of less than 3 μm.

16. The submillimeter-sized hot-wire sensor as claimed in claim 2, wherein the support rods made of nanocrystalline diamond each have a thickness of between 100 nm and 3 μm.

17. The submillimeter-sized hot-wire sensor as claimed in claim 1, wherein the thickness of the metal wire is between 1 μm and 3 μm.

18. The submillimeter-sized hot-wire sensor as claimed in claim 13, wherein the thermally-insulating layer is made of a material selected from the group consisting of silicon dioxide, silicon nitride, ceramic and a polymer material.

19. The submillimeter-sized hot-wire sensor according to claim 14, wherein the mechanical reinforcement has a thickness of between 100 nm and 3 μm.

20. A process for producing the submillimeter-sized hot-wire sensor as claimed in claim 1, characterized in that it comprises the steps consisting, starting from a substrate, in:
(a) depositing, on the front face of the substrate, a layer made of a material intended to form support rods of the sensor;
(b) etching said material deposited in step (a) in order to form at least two support rods;
(c) depositing at least two layers of metallic materials between the ends of the support rods etched in step (b) in order to form a metal wire, one of these layers being made of a material having a residual tensile stress and the other being made of a material having a residual compressive stress, the thicknesses of these metal layers being suitable for compensating for the residual stresses between the various layers in order to obtain a total residual stress of the metal wire that is below a limiting value;
(d) annealing the metal wire deposited in step (c);
(e) depositing one or more layers of metal on the support rods in order to form electrical contacts, so that each contact is connected to one of the ends of the metal wire;
(f) etching the substrate in order to free a portion of the support rods from the substrate.

21. The process for producing a submillimeter-sized hot-wire sensor as claimed in claim 20, wherein step (a) consists in growing a layer of nanocrystalline diamond on the front face of the substrate.

22. The process for producing a submillimeter-sized hot-wire sensor as claimed in claim 21, wherein step (a) comprises steps consisting in:
($a_1$) preparing a colloidal solution of nanometer-sized diamond crystallites diluted, for example in water;
($a_2$) placing the substrate in said solution;
($a_3$) subjecting the substrate thus immersed in this solution to ultrasounds.

23. The process for producing a submillimeter-sized hot-wire sensor as claimed in claim 20, wherein step (b) comprises the etching of a mechanical support extending between the two rods, intended for the mechanical support of the metal wire.

24. The process for producing a submillimeter-sized hot-wire sensor as claimed in claim 20, wherein step (c) is carried out by a lift-off process with a cap profile.

25. The process for producing a submillimeter-sized hot-wire sensor as claimed in claim 20, wherein step (d) is carried out at a temperature between 200° C. and 700° C. for a duration between 15 min and 45 min.

26. The process for producing a submillimeter-sized hot-wire sensor as claimed in claim 20, wherein step (e) consists in:
($e_1$) depositing a seed layer, for example by spraying, on the support rods; then
($e_2$) depositing at least one layer of metallic material by electrolysis onto the seed layer deposited in step ($e_1$), and optionally other metallic layers onto the first metallic layer.

27. The process for producing a submillimeter-sized hot-wire sensor as claimed in claim 20, wherein step (f) is carried out by chemical etching, for example by wet etching in a bath of KOH or by gas-phase etching in $XeF_2$.

28. The process for producing a submillimeter-sized hot-wire sensor as claimed in claim 20, wherein step (f) is carried out by physicochemical etching, for example plasma etching of Bosch DRIE type.

29. The process for producing a submillimeter-sized hot-wire sensor as claimed in claim 20, wherein an additional step consisting in depositing a thermally-insulating layer on the rods, and on the substrate, in the continuation of said rods, is provided before step (e).

\* \* \* \* \*